(12) United States Patent
Sasso et al.

(10) Patent No.: US 7,876,707 B2
(45) Date of Patent: Jan. 25, 2011

(54) PARTIAL BUILD OF A FIBRE CHANNEL FABRIC

(75) Inventors: Christian Sasso, Milpitas, CA (US); Anand Hariharan, San Jose, CA (US); Ronak Desai, Fremont, CA (US); Siddharth Kasat, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 457 days.

(21) Appl. No.: 11/851,225

(22) Filed: Sep. 6, 2007

(65) Prior Publication Data
US 2009/0067430 A1 Mar. 12, 2009

(51) Int. Cl.
*H04L 12/28* (2006.01)
*H04J 14/00* (2006.01)

(52) U.S. Cl. .......................... 370/254; 370/351; 398/45
(58) Field of Classification Search .................. None
See application file for complete search history.

(56) References Cited

U.S. PATENT DOCUMENTS

2003/0218986 A1* 11/2003 DeSanti et al. ............. 370/250
2007/0211650 A1* 9/2007 Banks et al. ............... 370/254

* cited by examiner

*Primary Examiner*—Ayaz R Sheikh
*Assistant Examiner*—Blanche Wong
(74) *Attorney, Agent, or Firm*—Patterson & Sheridan, LLP

(57) ABSTRACT

In one embodiment, a technique for performing partial build fabric operations when merging two or more Fibre Channel fabrics is provided. By maintaining a Principal Switch already assigned for one of two merging fabrics, a limited "partial build" may be performed for the other merging fabric. As a result, the time required for a Principal Switch selection phase may be greatly reduced.

20 Claims, 5 Drawing Sheets

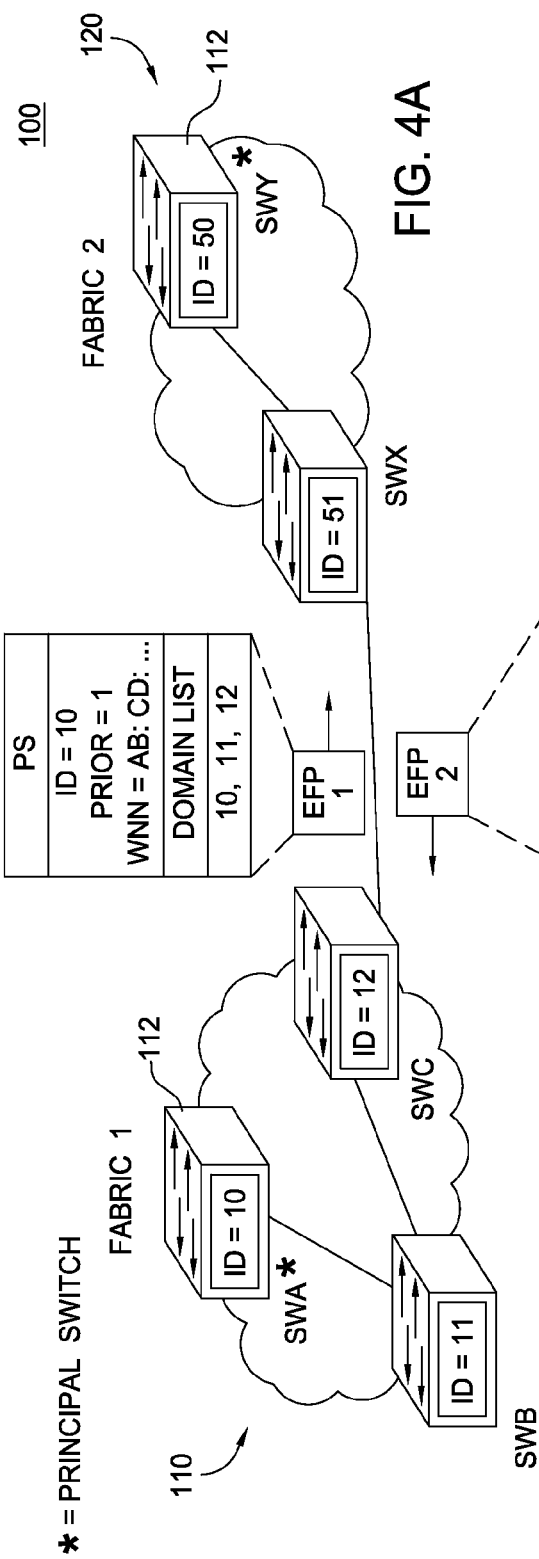

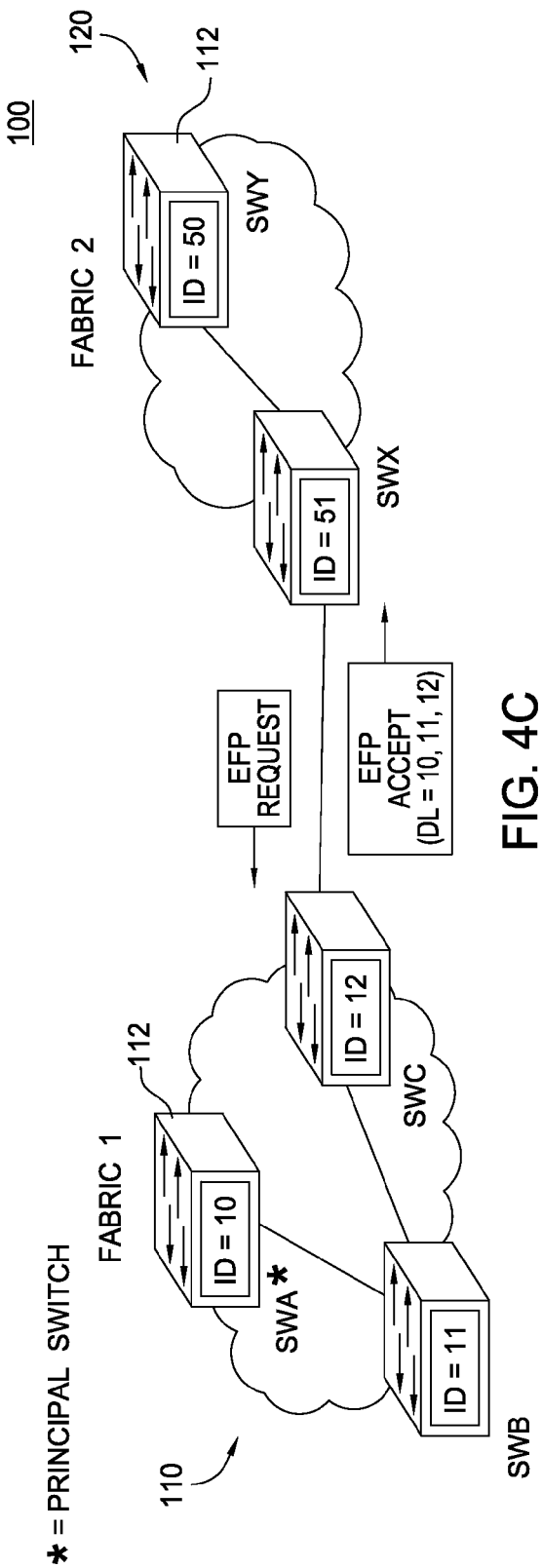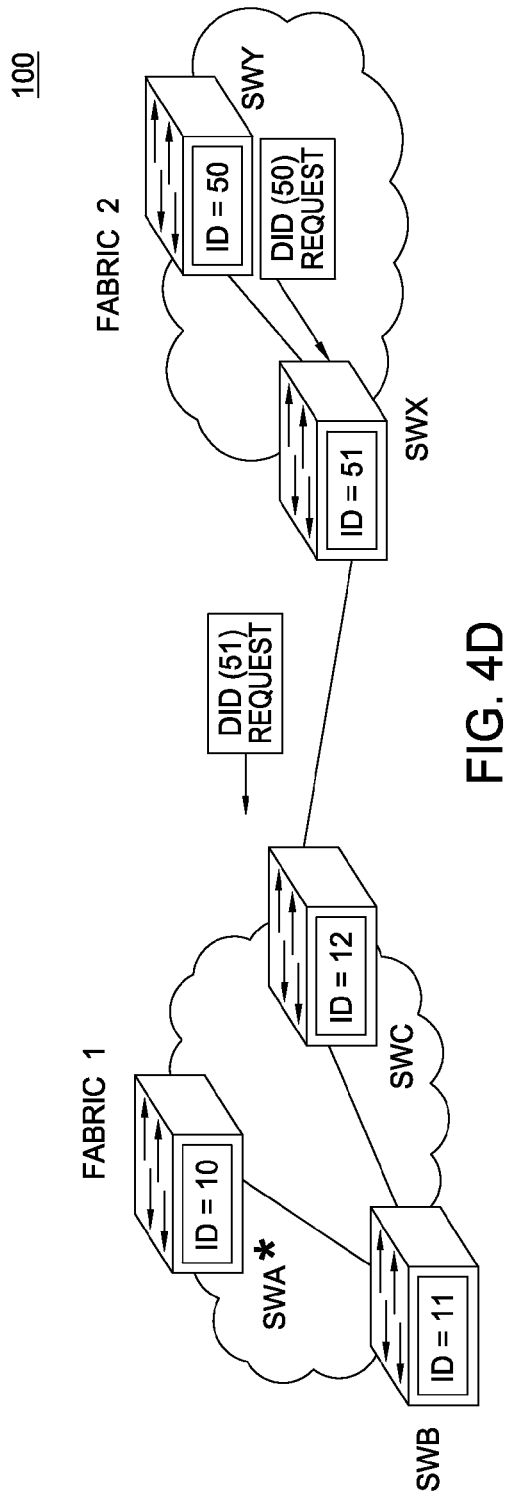

PARTIAL BUILD OF A FIBRE CHANNEL FABRIC

BACKGROUND OF THE INVENTION

1. Field of the Invention

Embodiments of the present invention generally relate to networks and, more particularly, to merging Fibre Channel network fabrics.

2. Description of the Related Art

The Fibre Channel standard addresses the general need in networking for very fast transfers of large amounts of information. Fibre Channel networks utilize an arrangement of switches, called a Fabric, to connect devices. This approach simplifies the overhead associated with network traffic, as a device with a Fibre Channel port need only manage a point-to-point connection between its port and the Fabric.

To eliminate ambiguity when routing traffic between switches in a fabric, each switch in a Fabric is assigned one or more unique Domain_IDs during a multi-phase process. In a first phase, one switch in the fabric is selected as a Principal Switch. The Principal Switch then assigns Domain_IDs to the other switches of the Fabric in a second phase.

It is often desirable to merge two stable Fibre Channel fabrics, for example, to expand a network or link network devices. When merging, the fabrics must again go through a build process, in which the Principal Switch of one of the fabrics is maintained and assigns Domain_IDs to the switches of the merged fabric. Unfortunately, this build process generally takes 15 seconds, which limits how quickly fabrics can be merged and generally adds to port bring-up time.

Accordingly, what is needed is a technique for reducing the time required for building a Fibre Channel fabric.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4D illustrate different stages of merging Fibre Channel fabrics in accordance with embodiments of the present invention.

DESCRIPTION OF EXAMPLE EMBODIMENTS

Embodiments of the present invention may reduce the time required for merging a Fibre Channel fabric in comparison to conventional fabric merge processes. By maintaining a Principal Switch already assigned for one of two merging fabrics, a limited "partial build" may be performed for the other merging fabric. As a result, the time required for a Principal Switch selection phase may be greatly reduced from the default 10 seconds to only few milliseconds.

As used herein, the term fabric generally refers to an arrangement of one or more interconnected switches that connect devices in a network. As used herein, the term Principal Switch generally refers to a switch in a Fibre Channel fabric that assigns Domain_IDs to other switches in the same fabric.

Embodiments of the present invention are described below with reference to merging two Fibre Channel fabrics. However, those skilled in the art will appreciate that the techniques described herein may also be more generally applied during a variety of different types of events that alter or reconfigure a fabric, such as re-booting a switch, reconfiguring a switch or any type of event in which a port is added to or merged with a fabric. Further, while embodiments described below involve the merging of two fabrics, the techniques described herein may be generally applied to merge any number of fabrics.

An Exemplary Network Environment

Figure 1:
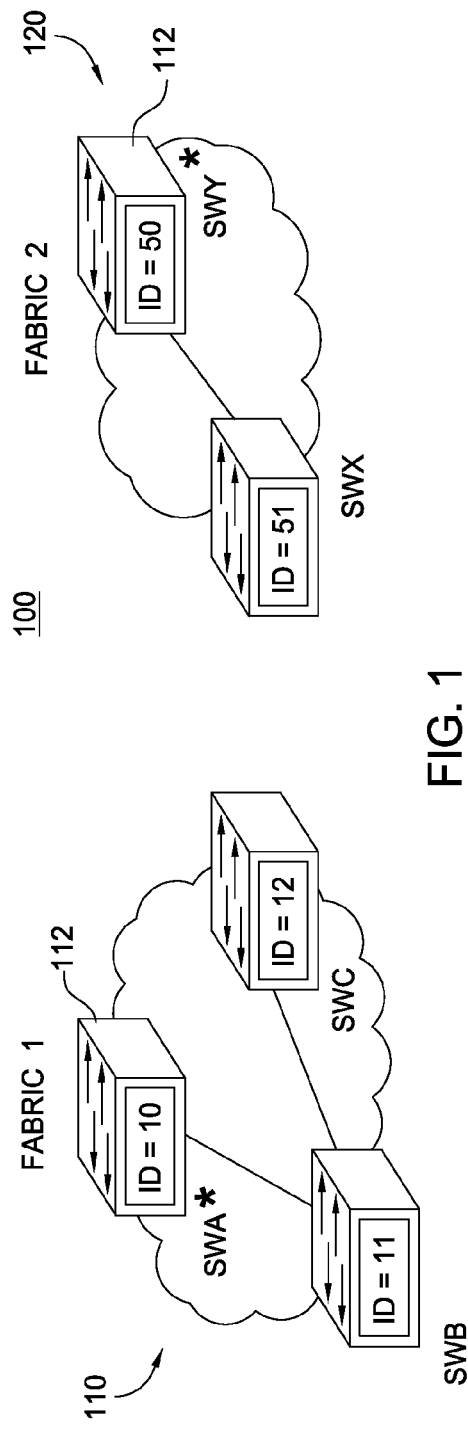
FIG. 1 illustrates an example of Fibre Channel fabrics that may be merged in accordance with embodiments of the present invention.

FIG. 1 illustrates one example of a network environment 100, in which embodiments of the present invention may be utilized. As illustrated, the network 100 includes two fabrics, Fabric 1 110 and Fabric 2 120. While each fabric may be formed by a relatively large number of different types of network elements, to simplify the illustrated example, each fabric is shown with a relatively small number of switches 112.

Fabric 1 has three switches, Switch A, Switch B, and Switch C, with unique Domain_IDs 10, 11, and 12, respectively. Switch A is designated as the Principal Switch for Fabric 1. Fabric 2 has two switches, Switch X and Switch Y, with unique Domain_IDs 50 and 51, respectively. Switch Y is designated as the Principal Switch for Fabric 2.

Figure 2:
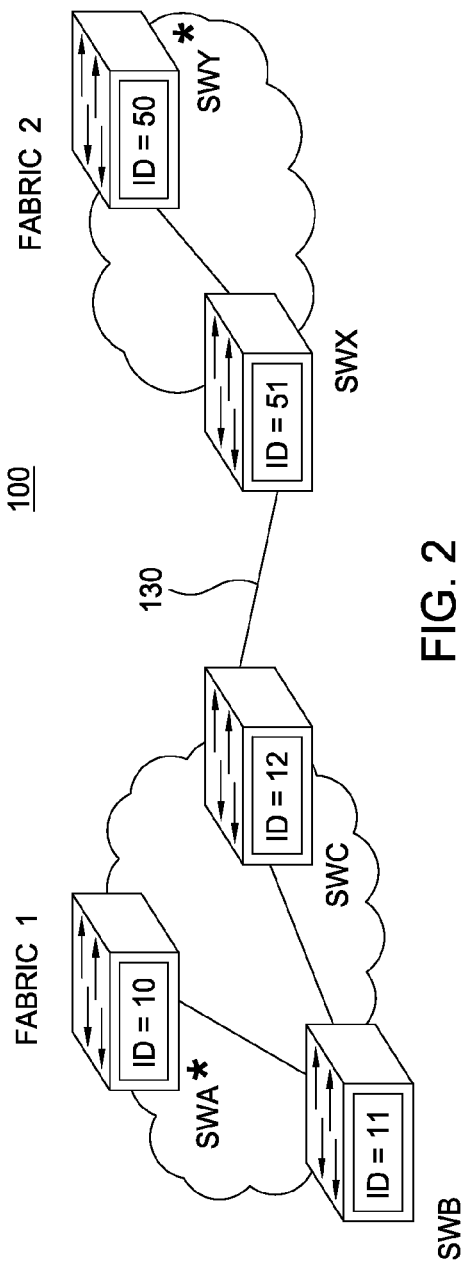
FIG. 2 illustrates the establishment of a link between the Fibre Channel fabrics of FIG. 1.

Fabrics 1 and 2 may be located within the same site (e.g., in a common building or campus) or on remote sites. In any case, a link 130 between Switch C and Switch X may be established to connect the fabrics, as shown in FIG. 2. The link 130 allows the fabrics to be merged and may include any suitable combination of components to allow communication between Switch C and Switch X.

As previously described, merging of two fabrics involves selection of a Principal Switch for the resulting merged fabric and assignment of unique Domain IDs. Typically, the principal switch after a merge will be the same as one of the two Principal Switches existing before the merge, such that one of the two merging fabrics retains its Principal Switch.

According to embodiments of the present invention, a "partial build" process may take place, wherein a merging fabric whose Principal Switch is maintained may forgo a normal Build Fabric (BF) phase of the fabric build process. The other fabric may undergo the BF phase, but with traffic limited to its fabric. At the end of this limited BF phase, the existing Principal Switch may directly distribute Domain_IDs to the switches that underwent the BF phase, essentially skipping the substantial time (e.g., on the order of 10 seconds) typically required to perform a conventional Principal Switch selection phase.

Figure 3:
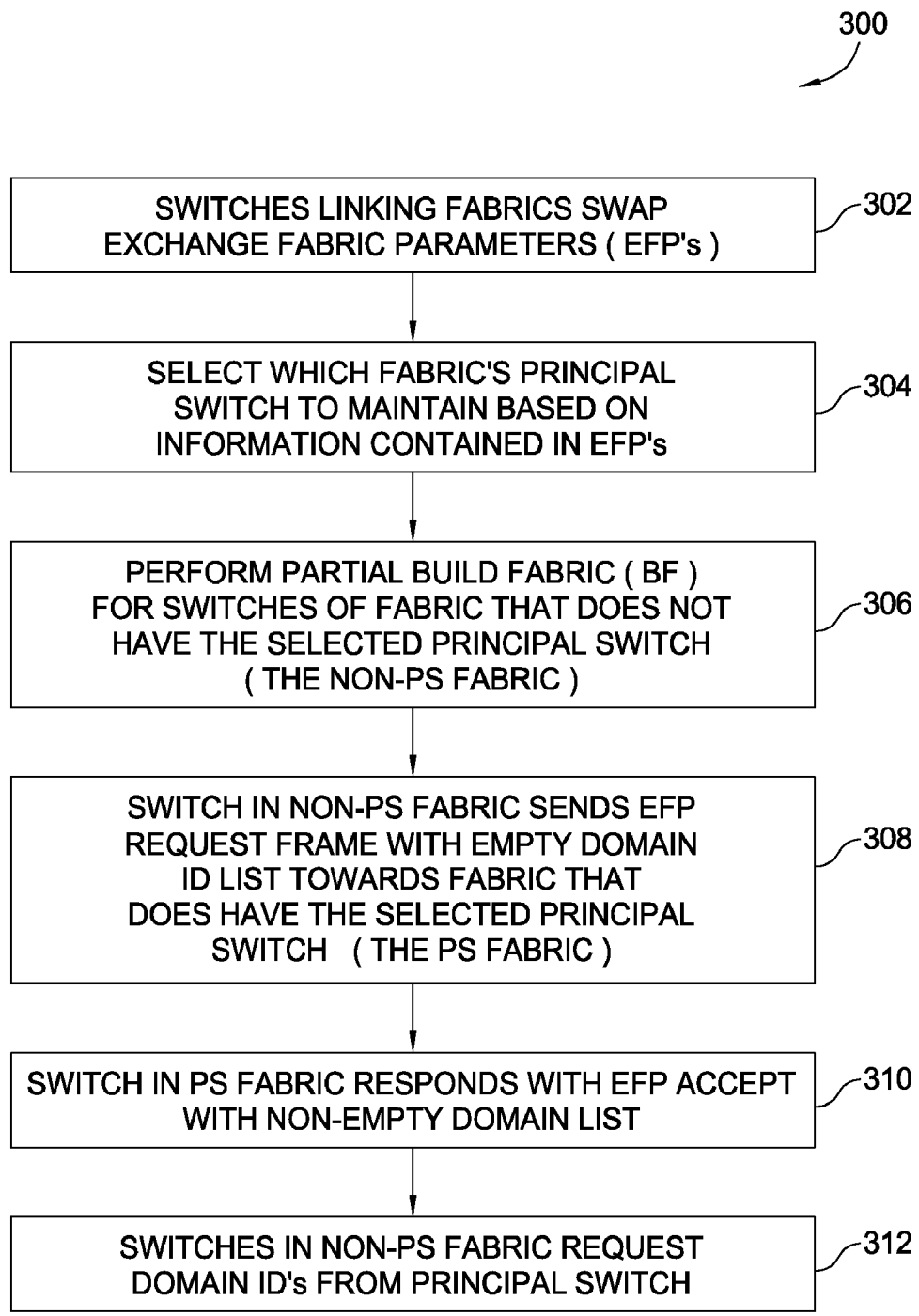
FIG. 3 is a flow diagram of example operations in accordance with embodiments of the present invention.

FIG. 3 is a flow diagram of example operations 300 that may be performed to carry out a partial Fabric build when merging two or more fabrics, in accordance with embodiments of the present invention. The operations 300 may be described with reference to FIGS. 4A-4D, which illustrate example traffic flow corresponding to various operations.

The operations begin, at step 302, where the switches linking the merging fabrics swap exchange fabric parameters (EFPs). As illustrated in FIG. 4A, the EFPs may contain an identification of the principal switch in each fabric and a list of Domain_IDs currently assigned in that fabric. Exchanging the domain lists enables each switch to determine that there are no Domain_ID conflicts. In this example, there are no Domain_ID conflicts. However, for some embodiments, if a domain conflict was detected, additional operations may be necessary in order to resolve the conflict before proceeding to the principal switch selection phase.

At step 304, an existing Principal Switch of one of the fabrics is selected based on information in the EFPs. For example, one simple approach is to select a Principal Switch with a better (e.g., lowest) priority. Priority is typically assigned as an 8-bit integer. In the illustrated example, Switch A has a priority of 1, while Switch Y has a priority of 2. Thus, according to this approach, Switch A is selected as the Principal Switch to maintain for the resulting merged fabric, which is reflected in FIG. 4B. For some embodiments, if both existing Principal Switches have the same priority, some other parameter will be used, such as a globally unique World Wide Name.

As the switches in the fabric containing the selected Principal Switch (the PS fabric), Fabric 1 in this example, have valid Domain_IDs already assigned by the maintained Principal Switch, there is no need for the switches in that fabric to undergo a build fabric (BF) phase. Thus, a partial BF may be performed, with BF traffic limited to Fabric 2.

At step 306, a partial BF is performed for switches of the merging fabric that does not have the selected principal switch (the non-PS fabric). As illustrated in FIG. 4B, in this partial BF phase, Switch X may send BF frames, but only towards the switches in Fabric 2. As Fabric 1 forgoes the BF phase, Switch C may not send any BF frames, but may simply wait for the BF phase of Fabric 2 to complete. Completion of the BF phase may be signaled by the beginning of a "partial" Principal Switch selection phase in Fabric 2.

At step 308, a switch in the Non-PS fabric sends an EFP request frame towards the PS fabric and, at step 310, a switch in the PS fabric responds to the EFP request with an EFP accept. For example, as illustrated in FIG. 4C, after the partial BF phase, Switch X may send an EFP request frame containing an empty domain Id List towards Switch C. Switch C may immediately respond with an EFP accept frame containing a non-empty Domain_ID List indicating the already-assigned Domain_IDs (10, 11, and 12).

The non-empty Domain_ID list in the EFP accept frame are taken by default as indicating that switches in Fabric 1 have better priority than switches in Fabric 2. Thus, switches in Fabric 2 may accept the Principal Switch identified in the EFP accept response (Switch A) as their principal. Thus, the partial Principal Switch selection phase may be completed almost immediately (e.g., after only a few milliseconds).

With the partial Principal Switch selection phase complete, at step 312, switches in the Non-PS fabric may proceed to request Domain IDs from the Principal Switch. As illustrated in FIG. 4D, Switches Y and X may send Domain_ID request frames to Principal Switch A, requesting the same Domain_IDs (50 and 51, respectively) they had before the merge.

Figure 5:
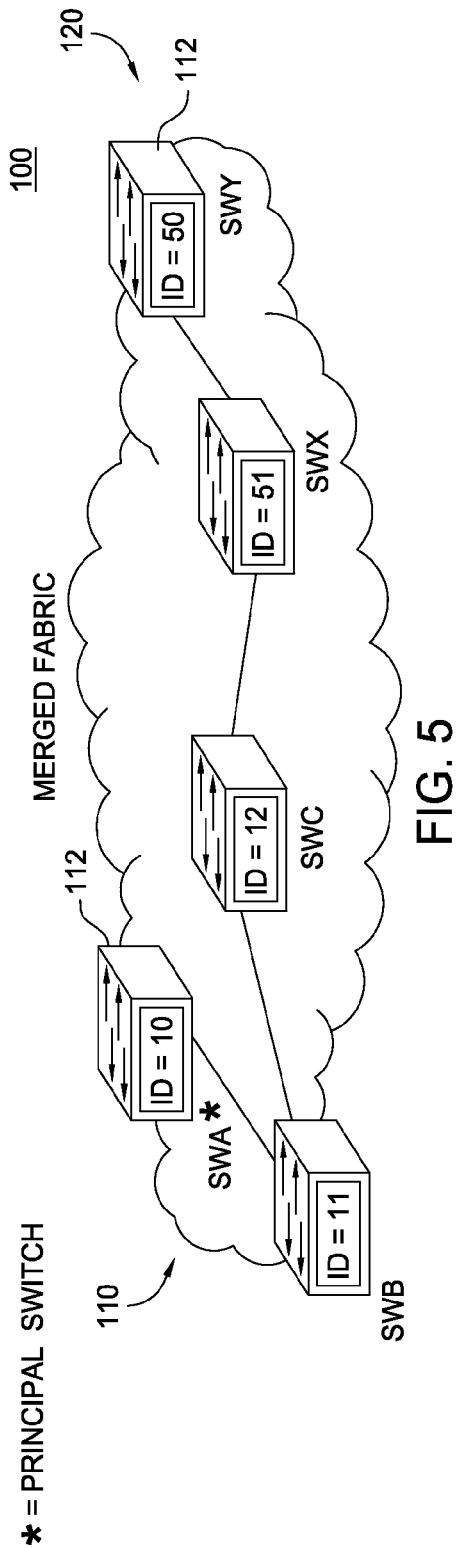
FIG. 5 illustrates a resulting merged Fibre Channel fabric in accordance with embodiments of the present invention.

The final merged fabric 510 resulting from merging Fabric 1 and Fabric 2 is illustrated in FIG. 5. As the Principal Switch A will have directly distributed the current domain list, each switch in the merged fabric 510 will have a path towards Principal Switch A.

Figure 6A:
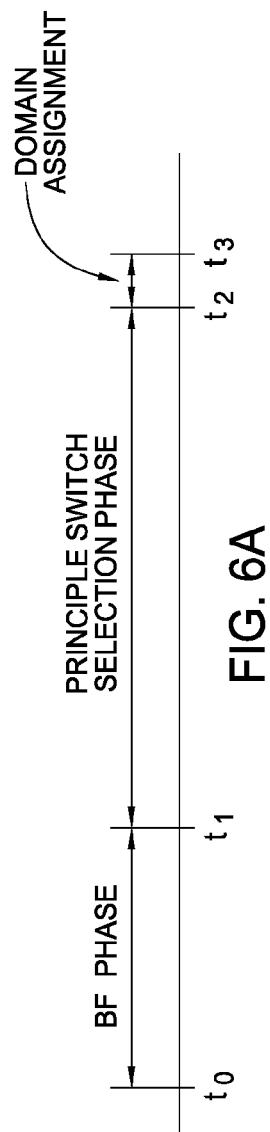
FIG. 6 illustrates a comparison of example timing of a Fibre Channel fabric build process according to a conventional approach and a Fibre Channel fabric build process in accordance with embodiments of the present invention.
Figure 6B:
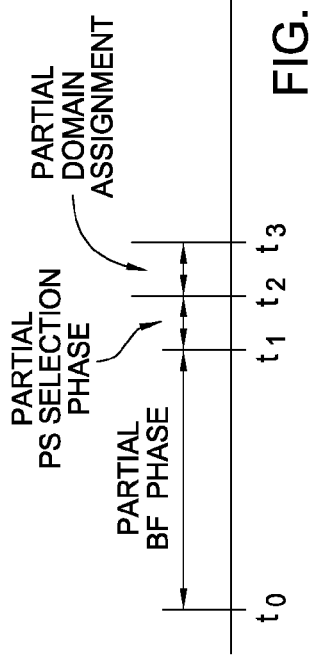

By performing the partial build operations, the merged fabric 510 was built much quicker than possible using conventional techniques, by effectively eliminating the vast majority of the time typically involved in Principal Switch selection. The potential reduction in build time is illustrated in FIG. 6, which illustrates an example time line 610 for a conventional fabric build and the partial fabric build described herein.

As illustrated, the time typically spent for the BF phase (e.g., approximately 5 seconds) is roughly the same for both techniques. The time spent in the Partial Principal Switch selection phase (e.g., only a few milliseconds), however, is substantially shorter than the time spent in the conventional ("Full") Principal Switch Selection phase (typically on the order of 10 seconds).

Reducing the build time by this amount not only results in significantly reduced merge times, but may also reduce the time of other activities, such as the time spent when switches are re-booted or new switches are added to fabric. The techniques described herein may also reduce time associated with port-pacing algorithms applied to switches after they are re-booted, which are commonly based on expected build times (conventionally on the order of 20 seconds, assuming 15 seconds for Principal Switch selection and Domain ID Assignment). Thus, the techniques described herein may enable all ports of a (rebooted) switch to come up much faster than with conventional techniques.

Further, the Principal Switch in the PS fabric that is maintained for the merger remains available throughout the partial build operations. As a result, new switches may be added to the PS fabric, even while the merger between fabrics is taking place. While precautions may be taken to ensure new switches do not request Domain_IDs of existing switches, this may be the case even if a full (fabric wide) BF phase takes place and new switches are added either during the BF phase or the subsequent Principal Switch Selection phase.

Partial Build operations may also reduce the overall traffic load on fabrics. For example, by limiting or eliminating many of the BF and EFP frames conventionally sent during a Principal Switch Selection phase, a substantial amount of traffic is eliminated, which may be particularly advantageous, for example, when using trunked ports (carrying multiple VSANs).

Interoperability

It should also be noted that it is not necessary that all switches in fabrics that need to be merged support the Partial Build techniques described herein. In fact, it may be sufficient that a single switch need support a Partial Build feature. For example, in the example illustrated in FIGS. 4A-4D, only switch C would need to support the feature.

In other words, if Switch C supports the feature while Switch X does not support it, then Switch X will send a BF frame towards switch C as well (not only towards Switch Y as described above). In this case, however, Switch C may simply respond with a BF accept frame, but will still resist starting a BF phase in Fabric 1. Once the partial BF phase is completed in Fabric 2, the Principal Phase selection will still be shortened, requiring only the time it takes for switch C to respond to an EFP request from Switch X.

This may have a significant effect in the market place, as this results in inter-operability between devices that support this feature and devices that do not. In other words, each device in a network does not need to be replaced if a single device supporting the feature is added. Further, the benefit of the feature in terms of reduced merge times may also be achieved, allowing a network to be upgraded without having to replace all the switches in a fabric.

Further, if a device that supports the feature is added to other devices that do not, the device may continue to operate in a conventional manner, in essence, merge times may simply regress to that of a conventional BF phase. As an example, if switch C does not support a partial BF, a regular BF will be started on Fabric 1 and the merger of Fabric 1 and Fabric 2 will exhibit conventional merger times, with both fabrics starting a regular BF phase (e.g., that eventually will take about 15 seconds to complete).

For some embodiments, the partial BF feature may be turned on and off via software. For example, a switch may be configured via a command line interface (CLI) to enable or disable the feature. As described above, however, even if the feature were not set as intended, device operation may still continue, albeit possibly without reduced merge times.

While the foregoing is directed to embodiments of the present invention, other and further embodiments of the invention may be devised without departing from the basic scope thereof, and the scope thereof is determined by the claims that follow.

What is claimed is:

1. A method, comprising:
   exchanging fabric parameters between devices in first and second Fibre Channel fabrics which are to be merged to create a merged fabric in which a switch of the first fabric that is already designated as a principal switch of the first fabric is maintained as a principal switch of the merged fabric; and
   performing build fabric operations for devices in the second fabric while forgoing build fabric operations for devices in the first fabric.

2. The method of claim 1, wherein performing build fabric operations for devices in the second fabric while forgoing build fabric operations for devices in the first fabric comprises:
   sending build fabric frames towards a switch in the second fabric; and
   ignoring build fabric frames sent towards a switch in the first fabric.

3. The method of claim 2, wherein ignoring build fabric frames sent towards a switch in the first fabric comprises:
   receiving a build fabric frame sent towards a switch in the first fabric; and
   responding to the received build fabric frame with a build fabric accept frame, without starting a build fabric phase in the first fabric.

4. The method of claim 1, wherein maintaining a switch of the first fabric that is already designated as a principal switch of the first fabric to be a principal switch of the merged fabric comprises:
   comparing a priority of a switch already designated as a principal switch of the first fabric to a priority of a switch already designated as a principal switch of the second fabric; and
   comparing at least one other parameter of the switches if the priorities of the switches already designated as principal switches match.

5. The method of claim 4, wherein comparing at least one other parameter of the switches comprises comparing globally unique World Wide Names of the switches.

6. The method of claim 1, further comprising receiving, by a device in the first fabric, a command to enable forgoing build fabric operations for devices in the first fabric.

7. A switch, comprising:
   an interface allowing the switch to connect to other devices as part of a first network fabric and to establish a link with a device in a second network fabric to be merged with the first network fabric to create a merged fabric; and
   hardware logic configured to:
      perform a set of build fabric operations for devices in the first network fabric during a merger of the first and second fabrics, if a second switch already designated as a second principal switch in the second fabric is to be maintained as a merged principal switch in the merged fabric; and
      forgo performing at least some of the build fabric operations for devices in the first network fabric during the merger, if a first switch already designated as a first principal switch in the first fabric is to be maintained as the merged principal switch in the merged fabric.

8. The switch of claim 7, wherein:
   the interface comprises a Fibre Channel interface and the first and second fabrics are Fibre Channel fabrics.

9. The switch of claim 8, wherein the logic is configured to, if a switch already designated as a principal switch in the first fabric is to be maintained as a principal switch in the merged fabric:
   forgo sending build fabric frames;
   receive an exchange fabric parameters (EFP) request frame from the device in the second fabric, the EFP request containing an empty domain ID list; and
   respond to the EFP request with an EFP accept response containing a non-empty domain ID list.

10. The switch of claim 7, wherein the logic is configured to, if a switch already designated as a principal switch in the first fabric is to be maintained as a principal switch in the merged fabric:
    ignore build fabric frames received from the device in the second fabric.

11. The switch of claim 7, wherein the logic is configured to, if a switch already designated as a principal switch in the first fabric is to be maintained as a principal switch in the merged fabric:
    receive a build fabric frame sent towards a switch in the first fabric; and
    respond to the received build fabric frame with a build fabric accept frame, without starting a build fabric phase in the first fabric.

12. The switch of claim 7, wherein the set of build fabric operations performed during a merger of the first and second fabrics if a switch already designated as a principal switch in the second fabric is to be maintained as a principal switch in the merged fabric comprises:
    partial build fabric operations involving only devices in the first fabric.

13. The switch of claim 12, wherein the partial build fabric operations comprise sending build fabric frames towards a device in the first fabric without sending build fabric frames towards a device in the second fabric.

14. The switch of claim 13, wherein the set of build fabric operations performed during a merger of the first and second network fabrics if a switch already designated as a principal switch in the second fabric is to be maintained as a principal switch in the merged fabric further comprises:
    sending an exchange fabric parameters (EFP) request frame to the device in the second fabric, the EFP request containing an empty domain ID list.

15. The switch of claim 7, wherein the logic is configured to determine whether a switch already designated as a principal switch of the first network fabric already designated as a principal switch of the second network fabric is to be maintained as a principal of the merged fabric by:
comparing a priority of a switch already designated as a principal switch of the first fabric to a priority of a switch already designated as a principal switch of the second fabric.

16. A switch, comprising:
means for connecting to other devices as part of a first network fabric and for establishing a link with a device in a second network fabric to be merged with the first network to create a merged fabric;
means for performing a set of build fabric operations for devices in the first network fabric during a merger of the first and second network fabrics, if a second switch already designated as a second principal switch in the second fabric is to be maintained as a merged principal switch in the merged fabric; and
means for forgoing performing at least some of the build fabric operations for devices in the first network fabric during the merger, if a first switch already designated as a first principal switch in the first fabric is to be maintained as the merged principal switch in the merged fabric.

17. The switch of claim 16, wherein:
the means for connecting comprises a Fibre Channel interface and the first and second fabrics are Fibre Channel fabrics.

18. The switch of claim 17, wherein the means for performing is configured to, if a switch already designated as a principal switch in the first fabric is to be maintained as a principal switch in the merged fabric:
forgo sending build fabric frames;
receive an exchange fabric parameters (EFP) request frame from the device in the second fabric, the EFP request containing an empty domain ID list; and
respond to the EFP request with an EFP accept response containing a non-empty domain ID list.

19. The switch of claim 16, wherein the set of build fabric operations performed during a merger of the first and second network fabrics if a switch already designated as a principal switch in the second fabric is to be maintained as a principal switch in the merged fabric comprises:
sending build fabric frames towards a device in the first fabric and not towards a device in the second fabric.

20. The switch of claim 16, wherein the means for performing is configured to determine whether a switch already designated as a principal switch of the first network fabric already designated as a principal switch of the second network fabric is to be maintained as a principal of the merged fabric by:
comparing a priority of a switch already designated as a principal switch of the first fabric to a priority of a switch already designated as a principal switch of the second fabric.

* * * * *